United States Patent [19]

Benante et al.

[11] 3,795,859

[45] Mar. 5, 1974

[54] METHOD AND APPARATUS FOR DETERMINING THE ELECTRICAL CHARACTERISTICS OF A MEMORY CELL HAVING FIELD EFFECT TRANSISTORS

[75] Inventors: Joseph F. Benante, Poughkeepsie, N.Y.; Nicholas M. Donofrio; Richard H. Linton, both of Essex Junction, Vt.

[73] Assignee: International Business Machines Corporation, Armonk, N.Y.

[22] Filed: July 3, 1972

[21] Appl. No.: 268,370

[52] U.S. Cl. ....... 324/73 R, 235/153 AC, 324/158 T

[51] Int. Cl. ........................ G01r 31/00, G01r 31/26

[58] Field of Search .......... 324/158 T, 73 R, 158 R; 340/173 FF; 235/153 AC

[56] References Cited

UNITED STATES PATENTS

| | | | |
|---|---|---|---|
| 3,390,382 | 6/1968 | Igarashi | 340/173 FF |
| 3,714,638 | 1/1973 | Dingwall et al. | 340/173 FF |
| 3,713,114 | 1/1973 | Linton et al. | 340/173 FF |
| 3,610,967 | 10/1971 | Palfi | 340/173 FF |
| 3,727,196 | 4/1973 | McKenny | 340/173 FF |

*Primary Examiner*—Alfred E. Smith
*Assistant Examiner*—Ernest F. Karlsen
*Attorney, Agent, or Firm*—Theodore E. Galanthay

[57] ABSTRACT

The electrical characteristics of a field effect transistor (FET) of a memory cell connected to a ZERO bit line and of an FET of the memory cell connected to a ONE bit line are determined through applying a substantially constant voltage to one of the ZERO and ONE bit lines while changing the voltage condition on the other of the bit lines. In one embodiment, the FET is a load device of the memory cell and has its source electrode connected to one of the bit lines and also to the drain electrode of another FET, which has its gate electrode connected to the other of the bit lines and functions as an active device of the cell. A substantially constant voltage is applied to the gate electrode through one of the bit lines to inactivate the FET which has its drain electrode connected to the source electrode of the FET having its electrical characteristics determined. The other of the bit lines is discharged for a predetermined period of time and then allowed to charge for another predetermined period of time. The measurement of this charged voltage will indicate whether the FET, which is the load device, is connected to the bit line and has the desired gain and whether the leakage current through the bit line is too high. In the other embodiment, a substantially constant voltage is applied to an FET which is the active device and has its drain electrode connected to one of the bit lines to have a substantially constant voltage applied thereto while its gate electrode is connected to the other of the bit lines to have two different voltages applied thereto. The difference in current flow through the active FET having the two different voltages applied to its gate electrode is employed to determine the threshold voltage of the FET.

9 Claims, 3 Drawing Figures

METHOD AND APPARATUS FOR DETERMINING THE ELECTRICAL CHARACTERISTICS OF A MEMORY CELL HAVING FIELD EFFECT TRANSISTORS

In integrated circuits, a plurality of memory cells is arranged on a chip in a matrix. Each of the cells on the chip includes a pair of FETs functioning as active storage devices. Thus, one of the FETs is connected to a ZERO bit line while the other FET is connected to a ONE bit line. If the particular cell is to store a ZERO, then the FET connected to the Zero bit line is turned on. Similarly, if the cell is to store a ONE, then the FET connected to the ONE bit line is turned on.

If the threshold voltage of either of the FETs is not within a selected range, then the FET will fail to either store the information during a write operation or provide the stored information during a read operation. Thus, it is necessary that each of the active FETs of each of the memory cells on a chip have a threshold voltage in the selected range for the chip to be satisfactory.

One previous means for determining the threshold voltage characteristic of field effect transistors, which are the active devices, of the memory cells of a chip has been to take measurements on a test site chip. The test site chip is produced by the same process as the actual chip is. While this is satisfactory in most instances, this measurement on a test site chip gives only tracking threshold voltage, which is the relative value of the threshold voltages of all of the ZERO and ONE FETs of the cells on a chip for various substrate voltages. However, it is not satisfactory when the threshold voltage of a particular FET in a cell is desired.

The present invention satisfactorily overcomes the foregoing problem by providing a method and apparatus for determining the threshold voltage of each of the active devices (FETs) of each of the cells on a particular chip. Accordingly, if the threshold voltage of either the ZERO or ONE FET of a memory cell is not within the desired voltage range, this can be easily ascertained.

In a memory cell having six FETs with two of the FETs functioning as ZERO and ONE active storage devices, two other of the FETs functioning as load devices for the two storage devices, and the final two FETs functioning as switches or controls to connect each of the storage devices to the appropriate bit lines during the read or write operations, it is necessary to determine whether the cell is capable of retaining the data indefinitely. If the load device is not connected to the internal cell node at which the active FET has its drain electrode connected and to which the bit line is connected through the control FET, the cell will not retain indefinitely the particular ZERO or ONE.

If the FET which functions as the load device is connected to the internal cell node, it still must have a specific gain to enable the active FET to retain the stored data indefinitely. Furthermore, if there is too large of a leakage current between the internal cell node and the bit line, the data also will not be retained in the active FET of the cell.

It is not only desired to be able to ascertain that the cell will retain the data indefinitely but it also is desired to be able to accomplish this test in a very short period of time. Otherwise, the cost of manufacturing is increased.

The present invention satisfactorily meets the foregoing requirements by providing a method and apparatus for testing each cell of a memory array or matrix on a chip. Each of the cells is tested in a very short period of time such as 20 to 25 microseconds when the bit line has a capacitive load of about 30 picofarads. Thus, the total test time for a chip having a matrix of 1024 cells ($32 \times 32$) (There are two sub-matrixes of $16 \times 32$ cells comprising the matrix). is 20 to 25 milliseconds. This small period of time for testing is approximately one-tenth of the time presently required to test a cell for data retention. Furthermore, the method and apparatus of the present invention detects even more data retention failures of a chip than the presently available test.

An object of this invention is to provide a method and apparatus for determining the electrical characteristics of a memory cell having FETs.

Another object of this invention is to provide a method and apparatus for measuring the ability of a memory cell having FETs to retain data in the cell.

A further object of this invention is to provide a method and apparatus for determining the threshold voltage of each of the active FETs of a memory cell comprising only FETs.

The foregoing and other objects, features, and advantages of the invention will be more apparent from the following more particular description of the preferred embodiments of the invention as illustrated in the accompanying drawing.

Figure 1:
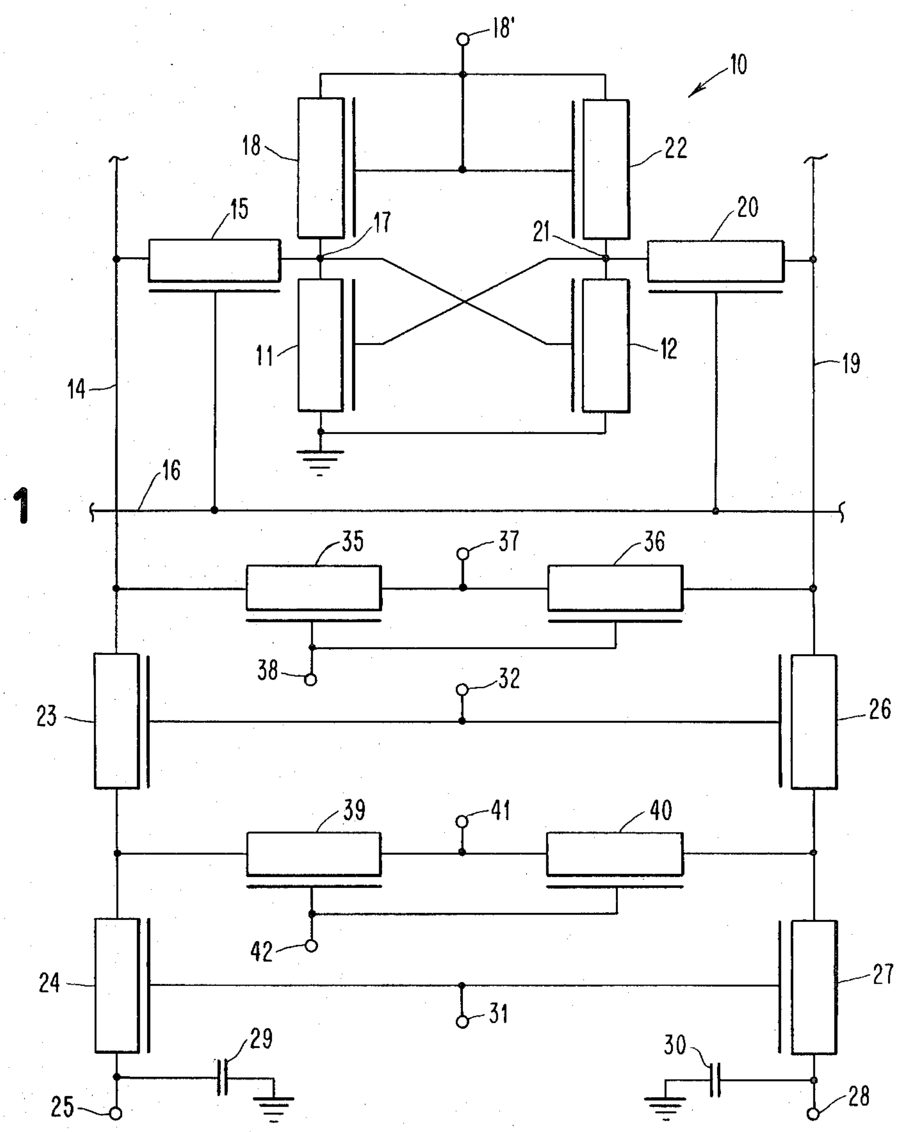
FIG. 1 is a schematic circuit diagram of a cell that is to be tested by the method and apparatus of the present invention.

Referring to the drawing and particularly FIG. 1, there is shown a memory cell 10, which is one of 1024 memory cells arranged in a matrix of $32 \times 32$ cells, for example, on a chip. Each of the 1024 memory cells is the same. The memory cell 10 includes a ZERO FET 11 and a ONE FET 12, which function as the active storage devices for the memory cell 10.

The ZERO FET 11 is connected to a ZERO bit line 14 through an FET 15, which has its gate electrode connected to a word line 16. Thus, the FET 15 must be activated during a read or write operation through a signal on the word line 16 for the FET 11 to be connected to the ZERO bit line 14. The FET 15 allows current to flow from the ZERO bit line 14 to an internal cell node 17 or vice versa.

The ZERO FET 11 has its drain electrode connected to the internal cell node 17 to which an FET 18, which functions as a load device, has its source electrode connected. The FET 18 has its drain and gate electrodes connected to a common contact 18' to which a low voltage, $V_L$, is applied, at all times. The FET 11 has its source electrode grounded.

The ONE FET 12 is connected to a ONE bit line 19 through an FET 20, which has its gate electrode connected to the word line 16. Accordingly, the FET 12 can be connected to the ONE bit line 19 only when the FET 20 is activated by a signal from the word line 16 during read or write. The FET 20 allows current to flow from the ONE bit line 19 to an internal cell node 21 or vice versa.

The FET 12 has its drain electrode connected to the internal cell node 21 to which an FET 22, which functions as a load device for the ONE FET 12, has its source electrode connected. The FET 22 has its drain and gate electrodes connected to the common contact 18'.

The ZERO FET 11 has its gate electrode connected to the internal cell node 21 so that the FET 11 is turned on when the voltage at the node 21 sufficiently exceeds the voltage at the node 17. The ONE FET 12 has its gate electrode connected to the cell node 17 so that the FET 12 is turned on when the voltage at the node 17 sufficiently exceeds the voltage at the node 21.

The ZERO bit line 14 is connected through an FET 23 and an FET 24 to a bit line pad 25. During operation, electric potential is supplied to the pad 25 for the ZERO bit line 14.

The ONE bit line 19 is connected through an FET 26 and an FET 27 to a bit line pad 28. The pad 28 has an electric potential applied thereto for the ONE bit line 19 during operation.

A load capacitance 29 is connected between the ZERO bit line 14 and ground, and a load capacitance 30 is connected between the ONE bit line 19 and ground. The load capacitances 29 and 30 are determined in accordance with the stray capacitances in the bit lines 14 and 19, respectively, so that each of these bit lines has a constant capacitance.

Although only one of the pads 25 and one of the pads 28 has been shown, it should be understood that there are actually two of the pads 25 and two of the pads 28 because the matrix of 32 × 32 cells on the chip actually comprises two separate submatrices of 16 × 32 cells. Each of the 16 rows of 32 cells of the sub-matrix is connected to one of the pads 25 and one of the pads 28. However, each of the word lines 16 extends through 32 cells with 16 of the cells being in one of the sub-matrices and 16 of the cells being in the other sub-matrix. Thus, there are 32 of the word lines 16 with each of the word lines 16 being connected to 32 cells with sixteen of the cells being in each of the sub-matrices.

The FETs 24 and 27 for each sub-matrix have their gate electrodes connected to each other and to a common contact 31. When a positive voltage pulse is applied to the common contact 31, the FETs 24 and 27 for one of the sub-matrices are turned on whereby the sub-matrix on the chip is deemed to be addressed since any of the memory cells 10 of the sub-matrix on the chip can now be activated. A chip has only one of the FETs 24 and one of the FETs 27 for each sub-matrix, and each sub-matrix is addressed separately.

When there are two sub-matrices of 16 × 32 cells on the chip, each of the sub-matrices has 16 of the FETs 23 and 16 of the FETs 26. Thus, there are a total of 32 of the FETs 23 and 32 of the FETs 26 on the chip. Each of the FETs 23 is connected by the ZERO bit line 14 to 32 of the cells 10 in a row, and each of the FETs 26 is connected by the ONE bit line 19 to 32 of the cells 10 in a row.

With this arrangement, each of the FETs 24 is connected to 16 of the FETs 23 and each of the FETs 27 is connected to 16 of the FETs 26. Thus, there are a total of 32 lines extending to the 32 FETs 23 from the two FETs 24, and a similar arrangement exists between the two FETs 27 and the FETs 26. However, since only one of the cells 10 is being shown, each of the ZERO bit line 14 and the ZERO bit line 19 has been shown as a single line.

The FET 23 and the FET 26, which are connected to the same 32 cells, have their gate electrodes connected to each other and to a common contact 32 as shown in FIG. 1. When a positive pulse is applied to the common contact 32, the FET 23 and the FET 26, which are connected to the common contact 32 and to the memory cell 10, are activated.

Accordingly, the cell 10 is addressed whenever the FET 23 and the FET 26, which are connected thereto, are activated by a positive pulse being supplied to the common contact 32 and a signal being supplied on the word line 16 to activate the FETs 15 and 20 of the cell 10. Thus, only one of the 32 cells connected to the particular bit lines 14 and 19 can receive a signal on one of the bit lines 14 and 19 when the FETs 15 and 20 are activated from the word line 16 during write or transmit a signal to one of the bit lines 14 and 19 when the FETs 15 and 20 are activated from the word line 16 during read.

An FET 35 and an FET 36 are connected between the ZERO bit line 14 and the ONE bit line 19 with the FET 35 having its source electrode connected to the ZERO bit line 14 and the FET 36 having its source electrode connected to the ONE bit line 19. The FETs 35 and 36 have their drain electrodes connected to a common contact 37 and their gate electrodes connected to a common contact 38.

The contact 37 has the low voltage, $V_L$, connected thereto at all times. Current can flow through the FETs 35 and 36 only when a positive pulse, which is greater than the threshold voltage of the FETs 35 and 36 is applied to the common contact 38. When this occurs, a voltage, which is equal to the low voltage, $V_L$, is applied to the bit lines 14 and 19.

There are 16 of the FETs 35 and 16 of the FETs 36 on each sub-matrix. All of the FETs 35 and 36 of each sub-matrix can be connected to the same common contact 37 and to the same common contact 38.

The FETs 35 and 36 are employed to restore each of the ZERO bit lines 14 and each of the ONE bit lines 19 to $V_L$ whenever a read or write operation is completed. Thus, the common contact 38 for all of the FETs 35 and 36 of a particular sub-matrix receives a positive pulse, which is greater than the threshold voltage of the FETs 35 and 36 whenever the common contact 32 of the same sub-matrix is not receiving a positive pulse. This insures that the ZERO bit lines 14 and the ONE lines 19 for all of the memory cells connected to the FETs 35 and 36 of a particular sub-matrix are returned to the voltage level of $V_L$ at the completion of a read or write operation.

An FET 39 is connected to the ZERO bit line 14 between the FETs 23 and 24 for each sub-matrix, and an FET 40 is connected to the ONE bit line 19 between the FETs 26 and 27 for each sub-matrix. The FET 39 has its source electrode connected to the ZERO bit line 14 so as to be connected to the electrode of the FET 24 prior to the ZERO bit line 14 becoming 16 different bit lines while the FET 40 has its source electrode connected to the ONE bit line 19 so as to be connected to the electrode of the FET 27 prior to the ONE bit line 19 becoming 16 different bit lines.

The FETs 39 and 40 for each sub-matrix have their drain electrodes connected to a common contact 41 to which the low voltage, $V_L$, is applied at all times. The FETs 39 and 40 for each sub-matrix have their gate electrodes connected to a common contact 42. Whenever a voltage, which is greater than the threshold voltage for the FETs 39 and 40 is applied to the common contact 42, the FETs 39 and 40 for the particular sub-matrix becomes active whereby the low voltage, $V_L$, is applied from the common contact 41 to the ZERO bit line 14 and the ONE bit line 19.

The FETs 39 and 40 allow the low voltage, $V_L$, to be applied to the bit lines 14 and 19 to restore the voltage level thereon to $V_L$ since one of the bit lines 14 and 19 may have had its potential reduced during a read or write operation. Thus, the common contact 42 for the FETs 39 and 40 for each sub-matrix receive a positive pulse whenever there is no signal being supplied to the common contact 31 for the same sub-matrix.

During manufacture, defects may occur whereby the FET 18 may not be connected to the cell node 17 or the FET 22 may not be connected to the cell node 21. If the FET 18 is not connected to the node 17, then any data stored in the ZERO FET 11 would not be retained indefinitely. Similarly, any data stored in the ONE FET 12 would not be retained indefinitely if the load FET 22 is not connected to the node 21.

Furthermore, if the FET 18 does not have a desired gain, then the ZERO FET 11 will not retain the data indefinitely. Similarly, if the FET 22 does not have a desired gain, then the ONE FET 12 will not retain the data indefinitely.

Additionally, if the leakage current from the node 17 is too high, this also will prevent the ZERO FET 11 from retaining the data indefinitely. Likewise, if the leakage current from the node 21 is too high, the ONE FET 12 will not retain the data stored therein indefinitely.

Figure 2:
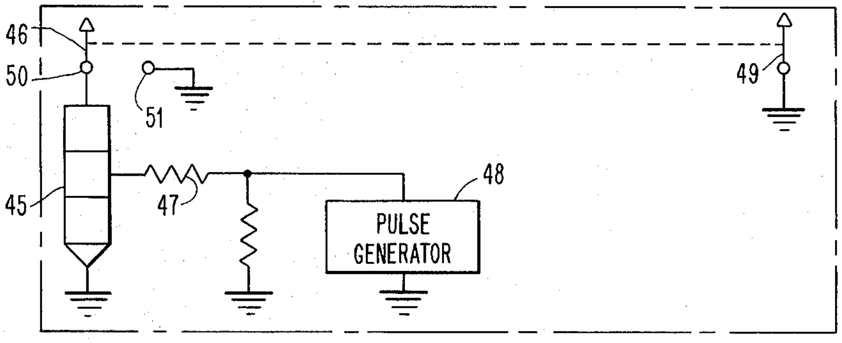
FIG. 2 is a schematic circuit diagram of the apparatus used with the cell of FIG. 1 for determining the data retention capability of the cell.

The apparatus of FIG. 2 enables all of these features to be checked at one time. If there is failure for any of these reasons, it is ascertained.

The apparatus of FIG. 2 includes an NPN transistor 45 having its collector connected through a switch 46 to the bit line pad 25 and its emitter grounded. The transistor 45 has its base connected through a resistor 47 to a pulse generator 48.

The transistor 45 is an NPN transistor when all of the FETs are N-channel devices. If the FETs should be P-channel devices, then the transistor 45 would be a PNP transistor.

Whenever the switch 46 is connected to the pad 25, the pad 28 is connected through a switch 49 to ground. Thus, when the transistor 45 is connected through the ZERO bit line 14, the ONE bit line 19 is grounded. Of course, it is necessary for the memory cell 10 to be addressed through supplying a positive pulse to the common contact 31 of its sub-matrix and a positive pulse to the common contact 32 for the pair of FETs 23 and 26 connected to the memory cell 10. Likewise, it is necessary for the word line 16 to have a signal applied thereto to turn on the FETs 15 and 20 of the memory cell 10.

With the switches 46 and 49 connected to the pads 25 and 28, respectively, the pulse generator 48 supplies a positive pulse to the base of the transistor 45 to turn it on for a predetermined period of time. During this time, the ZERO bit line 14 discharges to ground through the transistor 45 and its voltage becomes approximately zero. During this time, the FET 11 is turned off because of the ground potential supplied to its gate electrode from the ONE bit line 19 due to the switch 49 connecting the bit line pad 28 to ground.

When the positive pulse from the pulse generator 48 starts to fall, the transistor 45 turns off and the voltage on the ZERO bit line 14 starts to rise with a time constant that is primarily determined by the impedance of the FET 18 and the load capacitance 29. The FET 11 remains turned off because its gate electrode is still grounded since the switches 46 and 49 remain connected to the pads 25 and 28, respectively.

By connecting a high impedance voltage probe between a contact 50, which is between the switch 46 and the collector of the transistor 45, and a grounded contact 51, the voltage level on the ZERO bit line 14 can be measured. The maximum level to which the voltage of the ZERO bit line will rise is set by $V_L$, the threshold voltage of the FET 18, and the leakage current from the node 17.

If the load FET 18 is not connected to the node 17, the voltage on the ZERO bit line 14 will not rise. If the gain of the FET 18 is too low or the leakage current along the path is too high, then the voltage on the ZERO bit line 14 will not rise to the predetermined level within the predetermined time interval.

The switches 46 and 49, which are electronic controls, are arranged so that they remain in engagement with the pads 25 and 28, respectively, until the ZERO bit line 14 for each of the cells, which are connected to the pads 25 and 28 of the sub-matrix, has been connected to the transistor 45. Thus, each cell is tested through causing a signal to be placed on each of the word lines 16 in sequence.

Then, the switches 46 and 49 are reversed so that the switch 46 is connected to the pad 28 of the same sub-matrix and the switch 49 is connected to the pad 25 of the same sub-matrix. The same procedure is then performed to determine whether the FET 22 of the memory cell 10 has the desired electrical characteristics with the ONE bit line 19. This procedure is performed for all of the cells of the sub-matrix.

Then, the switches 46 and 49 are moved into engagement with the pads 25 and 28, respectively, of the other sub-matrix, until the ZERO bit line 14 for each of the cells of the other sub-matrix has been connected to the transistor 45. Then, the switches 46 and 49 are connected to the pads 28 and 25, respectively, of the other sub-matrix to test all of the cells connected to each of the ONE bit lines 19 of the other sub-matrix. Of course, each cell is tested through causing a signal to be placed on each of the word lines 16 in sequence.

Figure 3:
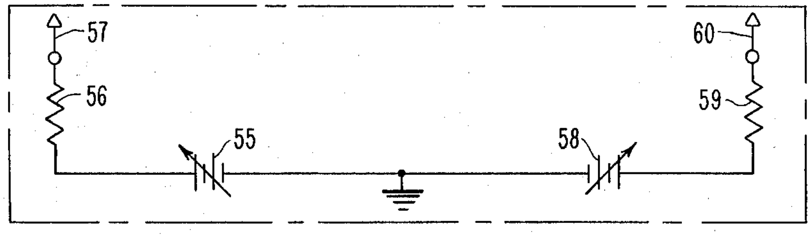
FIG. 3 is a schematic circuit diagram of the apparatus utilized with the cell of FIG. 1 for determining the threshold voltage of each of the active FETs of the cell.

When it is desired to ascertain the threshold voltage of each of the ZERO FETs 11 and the ONE FETs 12 of each of the memory cells, the apparatus of FIG. 3 is employed. The apparatus of FIG. 3 includes a variable voltage source such as a battery 55, for example, connected through a resistor 56 and a switch 57 to the bit line pad 25 and a variable voltage source such as a battery 58, for example, connected through a resistor 59 and a switch 60 to the bit line pad 28.

To ascertain the threshold voltage of the ZERO FET 11 and the ONE FET 12 of the cell 10, it is necessary that the FETs 24 and 27 be turned on along with the FETs 23 and 26 for the cell 10 and a signal applied to the word line 16 for the cell 10 to turn on the FETs 15 and 20. It also is necessary that the FETs 35 and 36 and the FETs 39 and 40 for the particular cell 10 be turned off. Additionally, the load FETs 18 and 22 should be turned off. This can be accomplished by reducing the low voltage, $V_L$, to the common contacts 18', 37, and 41 for the sub-matrix having the cell 10. This insures that all of the current will flow into either the ZERO FET 11 or the ONE FET 12 of the cell 10 depending on which of the FETs is being tested.

When the ZERO FET 11 is to be tested, the battery 55 should be set at a constant voltage which is preferably equal to the low voltage, $V_L$. Thus, if $V_L$ is three volts during normal operating conditions and is reduced to one volt at the common contacts 18', 37, and 41 during this test, then the battery 55 should supply one volt at the cell node 17.

With the ZERO FET 11 being tested, the voltage from the battery 58 is varied to supply two different voltages to the gate electrode of the FET 11. Thus, to ascertain the threshold voltage of the ZERO FET 11, the battery 58 produces two different voltages at the gate electrode of the ZERO FET 11 so as to cause two different currents, with one being four times the other, to flow through the ZERO FET 11.

The voltages from the battery 58 are selected in conjunction with the voltage at the battery 55 whereby the voltage at the node 17 exceeds the difference of the voltage at the node 21 and the threshold voltage of the ZERO FET 11. Furthermore, the voltage at the node 17 must not be such as to turn on the ONE FET 12 so that it must be less than the threshold voltage of the ONE FET 12.

The current flow through the ZERO FET 11 is determined by an ammeter measuring the current flow through the resistor 56. Thus, with each of the currents ascertained by the ammeter, each of the voltages applied to the gate electrode of the ZERO FET 11 by the battery 58 to produce these two currents is readily determined.

As previously mentioned, the two currents flowing through the ZERO FET 11 are a factor of four apart. Since there is separate control over the gate and drain electrodes of the ZERO FET 11, the standard technique for measuring the threshold voltage of a pinched-off device can be employed. That is, by measuring the gate-source voltage for two drain-source current values that are a factor of four apart on a device in pinch-off, the threshold voltage of the pinched-off device can be determined. This is because the current is proportional to the square of the difference between the gate-source voltage, which is the voltage applied to the gate electrode of the ZERO FET 11 by the battery 58 since the source electrode is grounded, and the threshold voltage, which is a constant. By determining the difference between the voltages to the gate electrode of the ZERO FET 11 for the two currents with one of the currents being four times the other and subtracting the lower of the two voltages from this difference, the threshold voltage of the ZERO FET 11 is obtained.

Each of the cells of one of the sub-matrices of the chip has the ZERO FET 11 checked before there is any checking of the ONE FET 12 of any of the cells of the same sub-matrix. Upon completion of checking all of the threshold voltages for the ZERO FET 11 for each of the cells of one sub-matrix, then the threshold voltage of the ONE FET 12 for each of the cells of the same sub-matrix is determined. This is accomplished by setting the battery 58 to produce a constant voltage at the node 21. The constant voltage is equal to $V_L$, which should be set to approximately one volt.

Then, the voltage of the battery 55 is varied to produce the current flow through the ONE FET 12 at two different voltages with one of the voltages producing a current four times the other. The currents are determined through an ammeter measuring the current flow through the resistor 59.

After all of the cells of the one sub-matrix have tested, then the batteries 55 and 58 are connected to the pads 25 and 28 of the other sub-matrix. Then, the ZERO FETs 11 and the ONE FETs 12 are tested in the same manner as previously described.

While the apparatus of FIG. 3 has been shown as being employed with each of the cells 10 having six of the FET devices, it should be understood that the apparatus of FIG. 3 could be employed with a memory cell in which the load FETs 18 and 22 are omitted. This is a four device cell in which a capacitance load is connected to each of the FETs 11 and 12.

An advantage of this invention is that is significantly reduces the time to test whether the load devices of a memory cell function properly. Another advantage of this invention is that it enables testing of each actual cell on a chip to determine its threshold voltage rather than relying on a test site chip to determine threshold characteristics of the cells on an actual chip.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for determining electrical characteristics of a memory cell including a first field effect transistor having one of its electrodes connected to a ZERO bit line and a second field effect transistor having one of its electrodes connected to a ONE bit line including:

applying a substantially constant voltage to one of the ZERO and ONE bit lines while changing the voltage condition on the other of the ZERO and ONE bit lines and determining whether one of the first and second field effect transistors has a desired electrical characteristic;

and then applying the substantially constant voltage to the other of the ZERO and ONE bit lines while changing the voltage condition on the one of the ZERO and ONE bit lines and determining whether the other of the first and second field effect transistors has a desired electrical characteristic.

2. The method according to claim 1 in which the first field effect transistor has its drain electrode connected to the ZERO bit line and its gate electrode connected to the ONE bit line and the second field effect transistor has its drain electrode connected to the ONE bit line and its gate electrode connected to the ZERO bit line including:

applying the substantially constant voltage to the drain electrode of the field effect transistor having its electrical characteristic determined;

changing the voltage condition on the gate electrode of the same field effect transistor having its electrical characteristic determined;

and determining the threshold voltage of the field effect transistor by determining the current flow through the field effect transistor at different voltages applied to its gate electrode.

3. The method according to claim 1 in which the first field effect transistor has its source electrode connected to the ZERO bit line and its drain and gate electrodes connected to a common voltage source with its source electrode also connected to the drain electrode of a third field effect transistor having its gate electrode connected to the ONE bit line and the second field effect transistor has its source electrode connected to the ONE bit line and its drain and gate electrodes connected to a common voltage source with its source electrode also connected to the drain electrode of a fourth field effect transistor having its gate electrode connected to the ZERO bit line including:

applying the substantially constant voltage to the gate electrode of one of the third and fourth field effect transistors having its drain electrode connected to the source electrode of the field effect transistor having its electrical characteristic determined while changing the voltage condition on the source electrode of the field effect transistor having its electrical characteristic determined by discharging for a first predetermined period of time the bit line to which the source electrode of the field effect transistor having its electrical characteristic determined is connected and then allowing the bit line to charge for a second predetermined period of time;

and determining the electrical characteristic of the field effect transistor by determining if the charged voltage on the bit line reaches a predetermined value at the end of the second predetermined period of time.

4. The method according to claim 3 in which the electrical characteristics determined of each of the first and second field effect transistors includes whether the field effect transistor is connected to the bit line, the gain of the field effect transistor, and the leakage current from the junction of the source electrode of the field effect transistor and the drain electrode of the field effect transistor of the third and fourth field effect transistors along the bit line connected to the source electrode of the field effect transistor having its electrical characteristics determined.

5. An apparatus for determining electrical characteristics of a memory cell including a first field effect transistor having one of its electrodes connected to a ZERO bit line and a second field effect transistor having one of its electrodes connected to a ONE bit line, said apparatus including:

first means to apply a substantially constant voltage selectively to each of the ZERO and ONE bit lines;

second means to change the voltage condition on the other of the ZERO and ONE bit lines from that to which said first means is applying the substantially constant voltage; and third means to determine whether one of the first and second field effect transistors has a desired electrical characteristic when said first means is applying the substantially constant voltage to one of the ZERO and ONE bit lines and said second means is changing the voltage condition on the other of the ZERO and ONE bit lines and whether the other of the first and second field effect transistors has a desired electrical characteristic when said first means is applying the substantially constant voltage to the other of the ZERO and ONE bit lines and said second means is changing the voltage condition on the one of the ZERO and ONE bit lines.

6. The apparatus according to claim 5 in which:

the first field effect transistor has its drain electrode connected to the ZERO bit line and its gate electrode connected to the ONE bit line and the second field effect transistor has its drain electrode connected to the ONE bit line and its gate electrode connected to the ZERO bit line;

said first means applies the substantially constant voltage to the drain electrode of the field effect transistors havings its electrical characteristic determined;

and said third means measures the current flow through the same field effect transistor at different voltages applied to its gate electrode by said second means.

7. The apparatus according to claim 5 in which:

the first field effect transistor has its source electrode connected to the ZERO bit line and its drain and gate electrodes connected to a common voltage source with its source electrode also connected to the drain electrode of a third field effect transistor having its gate electrode connected to the ONE bit line and the second field effect transistor has its source electrode connected to the ONE bit line and its drain and gate electrodes connected to a common voltage source with its source electrode also connected to the drain electrode of a fourth field effect transistor having its gate electrode connected to the ZERO bit line;

said first means applies the substantially constant voltage to the gate electrode of the field effect transistor of the third and fourth field effect transistors having its drain electrode connected to the source electrode of the field effect transistor having its electrical characteristic determined;

said second means includes means to discharge for a first predetermined period of time the bit line connected to the source electrode of the field effect transistor having its electrical characteristic determined;

and said third means includes means to determine the charge on the bit line a second predetermined period of time after said second means ceases to discharge the bit line.

8. The apparatus according to claim 7 in which said discharge means includes:

a transistor connecting the bit line to ground;

and means to activate said transistor for the first predetermined period of time.

9. The apparatus according to claim 5 for determining the electrical characteristics of each of a plurality of memory cells arranged in a matrix including means to cause each of the cells to be activated at a different time.

* * * * *